(12) United States Patent
Murai et al.

(10) Patent No.: US 6,862,059 B2
(45) Date of Patent: Mar. 1, 2005

(54) TRANSFLECTIVE LIQUID CRYSTAL DEVICE AND ELECTRONIC APPARATUS USING THE SAME

(75) Inventors: Ichiro Murai, Chino-si (JP); Tomoyuki Itoh, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 66 days.

(21) Appl. No.: 10/440,084

(22) Filed: May 19, 2003

(65) Prior Publication Data
US 2003/0231267 A1 Dec. 18, 2003

(30) Foreign Application Priority Data
May 22, 2002 (JP) ........................................ 2002-148239

(51) Int. Cl.⁷ ................................................. G02F 1/13
(52) U.S. Cl. ........................................ 349/114; 349/106
(58) Field of Search ................................ 349/106, 114, 349/113

(56) References Cited

U.S. PATENT DOCUMENTS

| | | | | |
|---|---|---|---|---|
| 6,124,909 A | * | 9/2000 | Miyashita et al. .......... | 349/109 |
| 6,215,538 B1 | * | 4/2001 | Narutaki et al. ............ | 349/106 |
| 6,259,500 B1 | * | 7/2001 | Kijima et al. ............... | 349/113 |
| 6,476,889 B2 | * | 11/2002 | Urabe et al. ................ | 349/106 |
| 6,697,135 B1 | * | 2/2004 | Baek et al. ................. | 349/106 |
| 2003/0030767 A1 | | 2/2003 | Takizawa et al. | |

FOREIGN PATENT DOCUMENTS

JP          A 11-44814          2/1999

* cited by examiner

*Primary Examiner*—James A. Dudek
(74) *Attorney, Agent, or Firm*—Oliff & Berridge, PLC

(57) ABSTRACT

The invention provides a transflective liquid crystal device and an electronic apparatus using the same to display images with a sufficient quantity of light in their use, even though a color filter for transmission display and a color filter for reflection display are formed in a pixel. On the surface of a counter substrate in a transflective liquid crystal device, a color filter for transmission display, with a wide chromaticity region, is formed in a transmission display region of the lower layer of the counter electrode, and a color filter for reflection display with a narrow chromaticity region is formed in a reflection display region. A boundary portion of the color filters is located inside the reflection display region.

15 Claims, 12 Drawing Sheets

TRANSFLECTIVE LIQUID CRYSTAL DEVICE AND ELECTRONIC APPARATUS USING THE SAME

BACKGROUND OF THE INVENTION

1. Field of Invention

The present invention relates to transflective liquid crystal devices and electronic apparatuses including the same. More specifically, the invention relates to forming a pixel having a color filter for transmission display and a color filter for reflection display inside one pixel.

2. Description of Related Art

Among various liquid crystal devices, one that can display images in both a transmission mode and a reflection mode, is referred to as a transflective liquid crystal device, and is used in various applications.

A related art transflective liquid crystal device, as shown in FIG. 14(A), has a reflection display region 100b and a rectangular window-shaped transmission display region 100c in a pixel 100a partitioned by a data line 6a and a scanning line 3a.

In such transflective liquid crystal device, a thin film transistor (hereinafter "TFT") as a pixel switching device, as shown in FIG. 14(B), includes a TFT array substrate 10 (a first transparent substrate) having a transparent pixel electrode 9a (a first transparent electrode) and a TFT to switch pixel 30 on the surface, a counter substrate 20 (a second transparent substrate) having a counter electrode 21 (a second transparent electrode) and a light shielding film 23 formed thereon, and a liquid crystal layer 50 held between the substrates 10 and 20. The substrate gap between the TFT array substrate 10 and the counter substrate 20 is defined by dispersing a gap material 5 having a predetermined particle diameter on the surface of one of the substrates, and sealing the TFT array substrate 10 and the counter substrate 20 using seal material (not shown).

In the TFT array substrate 10, a light reflecting layer 8a is formed in the reflection display region 100b in the pixel 100 in which a pixel electrode 9a faces a counter electrode 21, and a transmission display region 100c is formed in the remaining region (light transmitting window 8d) in which the light reflecting layer 8a is not formed.

Therefore, with regard to the light emitted from a backlight apparatus (not shown) disposed on the back side of the TFT array substrate 10, the light incident into the transmission display region 100c, as indicated by arrow LB, is incident from the TFT array substrate 10 into the liquid crystal layer 50, and is light-modulated in the liquid crystal layer 50, and then is emitted from the counter substrate 20 as a transmission display light to display images (transmission mode).

With regard to the external light incident from the counter substrate 20, the light incident into the reflection display region 100b, as indicated by arrow LA, passes through the liquid crystal layer 50, reaches the light reflecting layer 8a, is reflected from the light reflecting layer 8a, passes through the liquid crystal layer 50 again, and then is emitted from the counter substrate 20 as a reflection display light to display images (reflection mode).

In such a transflective liquid crystal device, if a color filter is formed on the counter substrate 20, the color display can be made on any one of the transmission mode and the reflection mode, but while the transmission display light is emitted after passing through the color filter just once, the reflection display light passes through the color filter twice.

Due to the above, in the counter substrate 20, while a color filter for reflection display 242 with a narrow chromaticity region is formed in the reflection display region 100b having the light reflecting film 8a a color filter for transmission display 241 with a wide chromaticity region is formed in the transmission display region 100c having the light transmitting window 8d.

The color filter for transmission display 241 and the color filter for reflection display 242 are formed by using photolithography technology, etc., and if a gap exists in a boundary portion 26, in the case of the display is performed in the transmission mode, light incident from the gap is to deteriorate the display quality. Therefore, in the related art, a light shielding film 230 is formed in the boundary portion 26 of the color filter for transmission display 241 and the color filter for reflection display 242.

The related art method is disclosed in Japanese Unexamined Patent Application Publication No. 11-044814.

SUMMARY OF THE INVENTION

However, in a liquid crystal device, since the quantity of light contributing to its display is determined by the size of the region which is capable of emitting the display light from inside the pixel 100a, as in the related art, if the light shielding film 230 is formed to cover the boundary portion 26 of the color filter for transmission display 241 and the color filter for reflection display 242, since the quantity of display light decreases as low as that, it becomes difficult or impossible to provide a bright display.

Further, as shown in FIG. 14(A), if a layout of the transmission display region 100c is surrounded by the reflection display region 100b, since the entire length of the boundary portion 26 of the color filter for transmission display 241 and the color filter for reflection display 242 is long, the region forming the light shielding film 230 becomes longer to notably decrease the quantity of light for display.

Further, in the transflective liquid crystal device, since the reflection display light passes through the liquid crystal layer 50 twice, while the transmission display light is emitted by passing through the liquid crystal layer 50 only once, it is difficult to enhance or optimize the retardation ($\Delta n \cdot d$) in both of the transmission display light and the reflection display light. Therefore, if the layer thickness "d" of the liquid crystal layer 50 is determined such that the display visibility in the reflection mode is enhanced, the display in the transmission mode is sacrificed. Or if the layer thickness "d" of the liquid crystal layer 50 is determined such that the display visibility in the transmission mode is enhanced, the display in the reflection mode is sacrificed.

The present invention addresses or solves the above and/or other problems, and provides a transflective liquid crystal device and an electronic apparatus using the same, capable of displaying images with sufficient quantity of light during its use, even though the color filter for transmission display and the color filter for reflection display are formed inside a pixel.

Further, the present invention provides a transflective liquid crystal device and an electronic apparatus using the same to enhance or optimize the retardation of a liquid crystal layer in both of a transmission display region and a reflection display region.

To address or solve the above, the present invention provides a transflective liquid crystal device including a first transparent substrate having first transparent electrodes and pixel switching elements formed on the surface in a matrix, a second transparent substrate having second transparent electrodes formed on the surface, the second transparent electrodes facing the first transparent electrodes to form pixels, and a liquid crystal layer held between the first transparent substrate and the second transparent substrate, and a light reflecting layer, in one part of the pixels functioning as a reflection display region, and in a remaining region of the pixels functioning as a transmission display region, is formed on the first transparent substrate. The transflective liquid crystal device may include a color filter for transmission display formed in the transmission display region on the second transparent substrate, and also a color filter for reflection display formed in the reflection display region on the second transparent substrate, a chromaticity region of the color filter for reflection display being narrower than that of the color filter for transmission display. A boundary portion of the color filter for transmission display and the color filter for reflection display is located in the reflection display region.

"A wide chromaticity region" in the specification of the present invention means that the area of a color triangle as shown, for example, in a CIE1931rgb calorimetric system chromaticity diagram is large, and has a dark color tone.

The transflective liquid crystal device makes a display only in a reflection mode in a waiting state of the apparatus provided with the device, and in its used state, a back light is lighted, and a display is made in a transmission mode in addition to the reflection mode. In the present invention to correspond to the states for such use, since a boundary portion of the color filter for transmission display and the color filter for reflection display is located in the reflection display region, the color filter for transmission display is appropriately formed in the transmission display region. Therefore, even though the color filters overlap in the boundary portion of the color filter for transmission display and the color filter for reflection display, or a gap is made between the color filters, the boundary portion of the color filters does not affect the displayed image in the case of using the apparatus for displaying in a transmission mode. Therefore, since it is not necessary to form a light shielding film in the boundary portion of the color filter for transmission display and the color filter for reflection display on the second transparent substrate, the image can be displayed with a sufficient quantity of light.

With respect to the present invention, the color filter for transmission display may overlap the color filter for reflection display in the boundary portion of the color filter for transmission display and the color filter for reflection display.

Further, according to the present invention, a gap may be formed between the color filter for transmission display and the color filter for reflection display in the boundary portion of the color filter for transmission display and the color filter for reflection display. Even if a gap is made between the color filters in the boundary portion of the color filter for transmission display and the color filter for reflection display, since the quantity of the external light incident through the gap and being directly emitted out through the gap without passing through the color filter is very small in the reflection display region, the quality of displayed images is rarely affected.

In the present invention, preferably, the pixel has a substantially rectangular plane shape, and the boundary portion of the transmission display region and the reflection display region is extended in a straight line inside the pixel so that three sides of the transmission display region overlap the three sides of the pixel. Due to the above structure, since the boundary portion of the color filter for transmission display and the color filter for reflection display becomes shorter so as to be able to suppress the influence due to the boundary portion.

In the present invention, the boundary portion of the transmission display region and the reflection display region is preferably extended parallel with a short side of the pixel. By doing so, the boundary portion of the color filter for transmission display and the color filter for reflection display becomes the shortest, so as to be able to suppress the influence due to the boundary portion.

In the present invention, it is preferable that by forming the color filter for reflection display thicker than the color filter for transmission display, the thickness of the liquid crystal layer in the reflection display region is thinner than the thickness of the liquid crystal layer in the transmission display region. Due to the above structure, it is possible to make the thickness of the liquid crystal layer in the reflection display region thinner than the thickness of the liquid crystal layer in the transmission display region without an addition of a new layer. Due to such a possibility, even though the reflection display light passes through the liquid crystal layer twice, while the transmission display light is emitted by passing through the liquid crystal layer once, the retardation ($\Delta n \cdot d$) can be enhanced or optimized in both of the transmission display light and the reflection display light.

In the present invention, a layer-thickness adjusting layer is preferably formed on a surface of at least one of the first transparent substrate and the second transparent substrate, such that the thickness of the liquid crystal layer in the reflection display region becomes thinner than the thickness of the liquid crystal layer in the transmission display region. Due to the above structure, since the thickness of the liquid crystal layer in the reflection display region becomes thinner than the thickness of the liquid crystal layer in the transmission display region, even though the reflection display light passes through the liquid crystal layer twice, while the transmission display light is emitted by passing through the liquid crystal layer once, the retardation ($\Delta n \cdot d$) can be enhanced or optimized in both of the transmission display light and the reflection display light.

In the present invention, the layer-thickness adjusting layer is preferably a transparent layer formed on the second transparent substrate. If constructed as above, even with the layer-thickness adjusting layer being provided, the exposure precision in a photolithography process to form an element to provide pixel switching on the first transparent substrate is not lowered. Therefore, the present invention can provide a transflective liquid crystal device having a high reliability and a high quality of display.

With regard to the present invention, the layer-thickness adjusting layer may be selectively formed in a region overlapped with the color filter for reflection display. In this case, the end portion of the layer-thickness adjusting layer is preferably located inside the reflection display region. In the configuration as above, even though the end portion of the layer-thickness adjusting layer is tapered in the surface, and the layer thickness of the liquid crystal layer is deviated from an appropriate value in the portion, the deviation of the layer thickness does not affect the quality of display when performing displaying in a transmission mode.

In the present invention, the layer-thickness adjusting layer may be thickly formed in the reflection display region, and may be formed thinner in the transmission display region than in the reflection display region. In this case, the layer-thickness adjusting layer is preferably formed such that a boundary portion of the portion thickly formed in the reflection display region and the portion thinly formed in the transmission display region, is located inside the reflection display region. Due to the above structure, the layer-thickness adjusting layer has a taper-shaped step which is the difference between a thick portion and a thin portion, and therefore, even though the layer thickness of the liquid crystal layer is deviated from an appropriate value, such a deviation does not affect the quality of display when performing displaying in a transmission mode.

With regard to the present invention, a columnar protrusion is preferably formed on a surface of at least one of the first transparent substrate and the second transparent substrate, the columnar protrusion defines the substrate gap between the first transparent substrate and the second transparent substrate by protruding from one of the substrates and abutting against the other substrate. If the substrate gap is adjusted by the columnar protrusion formed on the first transparent substrate or the second transparent substrate, it is not necessary to disperse a gap material, even though an unevenness is formed on the first transparent substrate or the second transparent substrate due to the thickness balance of the color filters or the formation of the layer-thickness adjusting layer. Due to the above, a deviation of the substrate gap caused from the fact that a gap material comes into a concave portion of the unevenness due to the layer-thickness adjusting layer between the first transparent substrate and the second transparent substrate does not occur, and the retardation (Δn·d) can be held in an enhanced or optimum state. Therefore, a high quality of display can be performed.

The liquid crystal device according to the present invention can be used as a display unit of an electronic apparatus, such as a mobile phone, a portable computer, etc., for example.

DETAILED DESCRIPTION OF PREFERRED EMBODIMENTS

Figure 1:
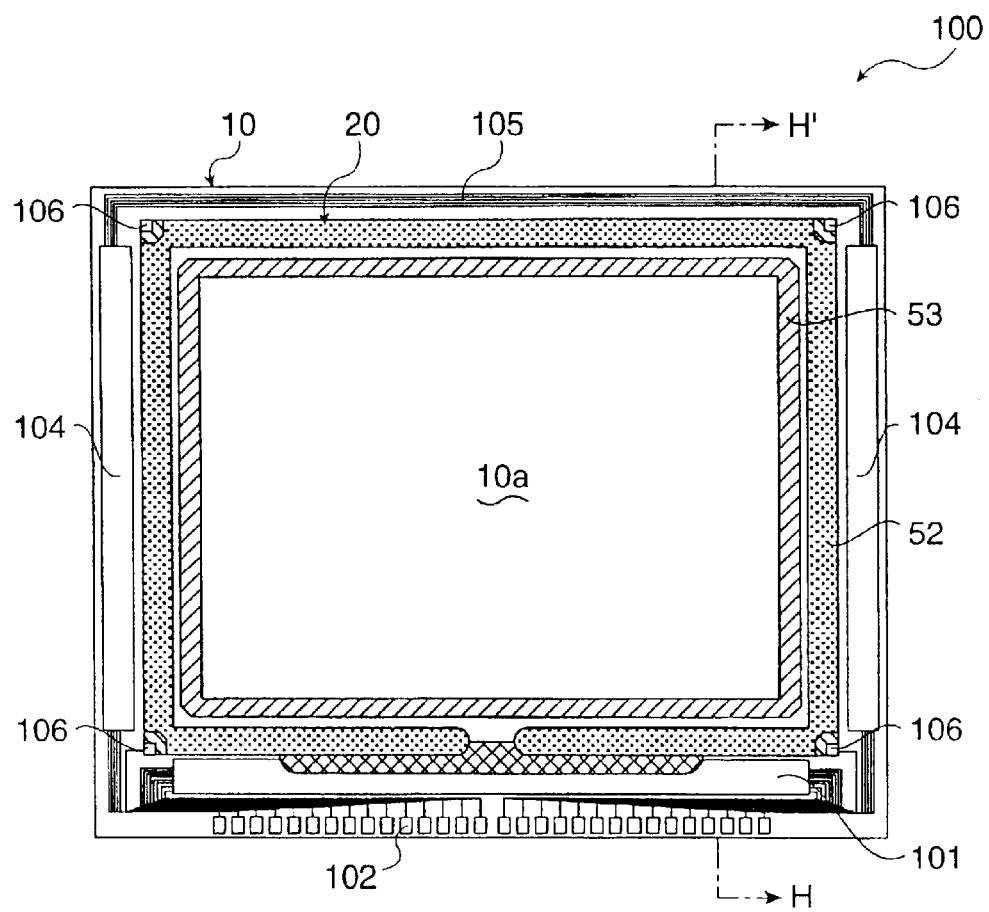
FIG. 1 is a plan view of a transflective liquid crystal device according to the present invention as viewed from a counter substrate.

Exemplary embodiments of the present invention are explained below in detail with reference to the drawings. Further, in the drawings in the following description, the scales of layers or members are different since each layer or member is merely drawn with a size to be recognizable in the drawings.

[First Exemplary Embodiment]
(Basic Structure of a Transflective Liquid Crystal Device)

Figure 2:
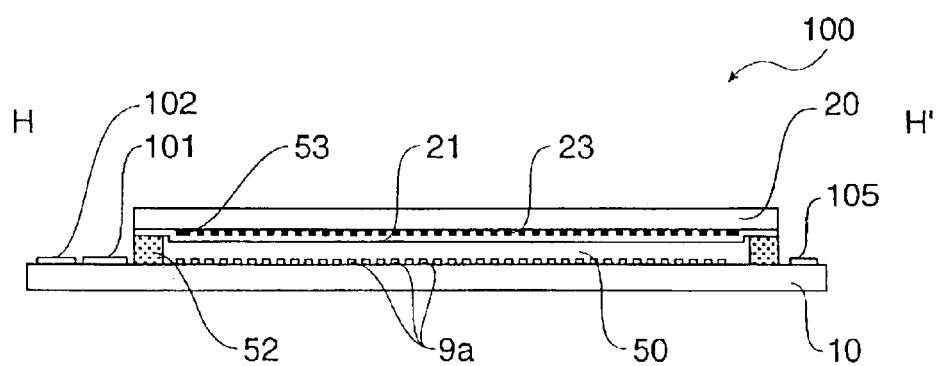
FIG. 2 is a sectional view of FIG. 1 taken along plane H-H' of FIG. 1.
Figure 3:
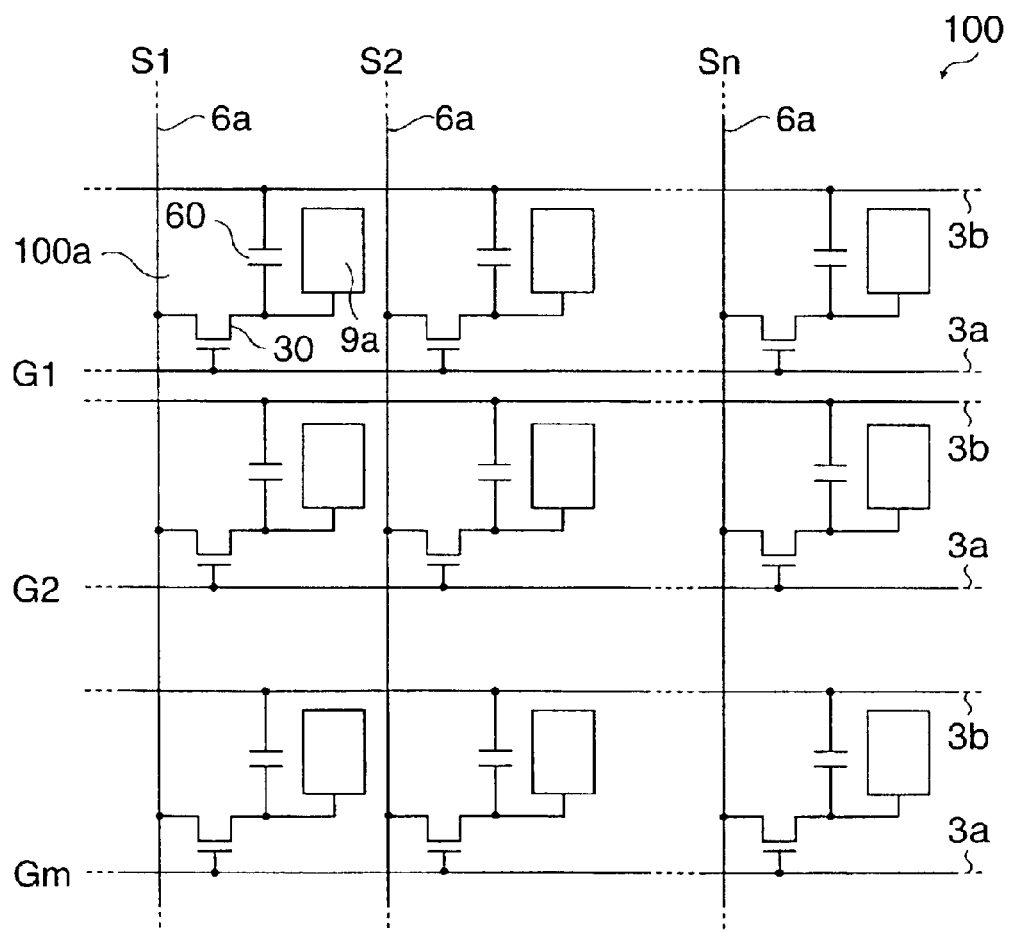
FIG. 3 is a schematic circuit diagram showing component elements, etc. of the transflective liquid crystal device formed on a plurality of pixels in a matrix shape.

FIG. 1 is a plan view of a transflective liquid crystal device according to the present invention as viewed from component elements and a counter substrate, and FIG. 2 is a sectional view taken along plane H-H' of FIG. 1. FIG. 3 is an equivalent circuit diagram showing component elements, wirings, etc. in a plurality of pixels formed in a matrix shape in the image display region of the transflective liquid crystal device. Further, in the following description, the scales of layers or members in the drawings are different since each layer or member is merely drawn with a size to be recognizable in the drawings.

As shown in FIGS. 1 and 2, a transflective liquid crystal device 100 of this exemplary embodiment is configured such that a liquid crystal layer 50 as an electric optical material is held between a TFT array substrate 10 (a first transparent substrate) and a counter substrate 20 (a second transparent substrate) which are sealed by a seal material 52, and a peripheral partition 53 made of a light shielding material is formed in the inner region of the portion formed by the seal material 52. A data line driving circuit 101 and a mounting terminal 102 are formed in the external region of the portion formed by the seal material 52 along one side of the TFT array substrate 10, and a scanning line driving circuit 104 is formed along two sides neighboring one side respectively. A plurality of wirings 105 are provided on the remaining one side of the TFT array substrate 10 to connect the scanning line driving circuits 104 provided in both sides of the image display region, and additionally, a pre-charge circuit or a test circuit can be provided by using the downside of the peripheral partition 53, or the like. Further, an up-down conductive material 106 is formed on at least one of the corner portions of the counter substrate 20 to provide an electrical conduction between the TFT array substrate 10 and the counter substrate 20. Further, the data line driving circuit 101 and the scanning line driving circuit 104, etc. can be overlapped with the seal material 52, or can be formed in the inner region of the seal material 52.

Further, instead of forming the data line driving circuit 101 and the scanning line driving circuit 104 on the TFT array substrate 10, for example, a TAB (tape automated bonding) substrate having a driving LSI provided thereon, can be provided to be electrically or mechanically connected with a terminal group provided in the peripheral region of the TFT array substrate 10 through an anisotropic conductive film. Further, in the transflective liquid crystal device 100, a polarizing film, a phase difference film, a polarizing plate, etc. can be arranged in a predetermined direction according to the types of the liquid crystal layer 50 being used, that is, an operation mode, such as a TN (twisted nematic) mode, an STN (super TN) mode, etc., or each of normally white mode/normally black mode. However, illustration thereof is omitted.

Further, since the transflective liquid crystal device 100 of the present exemplary embodiment is for color display, as described below, each color filter of R, G, B is formed in the region facing each pixel electrode 9a on the TFT array substrate 10 of the counter substrate 20.

In the image display region of the transflective liquid crystal device 100 constructed as above, as shown in FIG. 3, a plurality of pixels 100a are formed in a matrix shape, and pixel electrodes 9a and a TFTs to provide pixel 30 switching to drive the pixel electrode 9a are formed in each pixel 100a, and a data line 6a to supply pixel signals S1, S2, . . . and Sn is electrically connected to the source of the TFT 30. The pixel signals S1, S2, . . . and Sn input in the data line 6a can be supplied line-sequentially in this order, or can be supplied with group for a plurality of data lines 6a neighboring each other. Further, a scanning line 3a is electrically connected to the gate of the TFT 30, and scanning signals G1, G2, . . . and Gm are applied line-sequentially to the scanning line 3a in this order in pulse at a predetermined timing. The pixel electrode 9a is electrically connected to the drain of the TFT 30, and the pixel signals S1, S2, . . . and Sn supplied from the data line 6a are input on each pixel at a predetermined timing by being the TFTs 30, which are switching elements, on-state only for a predetermined period. By doing so, the pixel signals S1, S2, . . . and Sn of a level, applied in the liquid crystal through the pixel electrode 9a, are held between the pixel electrode 9a and a counter electrode 21 of the counter substrate 20 for a predetermined period.

The liquid crystal layer 50 changes the orientation or order of the molecular group according to the level of voltage applied to provide the light modulation and the gradation display. In the case of a normally white mode, the quantity of the incident light passing through the liquid crystal layer 50 decreases according to the voltage applied, and in the case of a normally black mode, the quantity of the incident light passing through the liquid crystal layer 50 increases according to the voltage applied. As a result, the light having the contrast according to pixel signals S1, S2, . . . and Sn is emitted from the transflective liquid crystal device 100 as a whole.

Further, to reduce or prevent the leak of the held pixel signals S1, S2, . . . and Sn, a storage capacitor 60 can be added parallel with a liquid crystal capacitor formed between the pixel electrode 9a and the counter electrode. For example, the voltage of the pixel electrode 9a is held by the storage capacitor 60 for a longer time as much as three digit hours than the time applied by the source voltage. By such a structure, the maintenance characteristic of the charges is enhanced, and the transflective liquid crystal device 100 having a high contrast ratio can be realized. Further, as a method of forming the storage capacitor 60, either a method of forming between capacitor lines 3b as circuits to form the storage capacitor 60, or a method of forming between scanning lines 3a of leading ends as shown in FIG. 3 can be used.

(Structure of the TFT Array Substrate)

Figure 4:
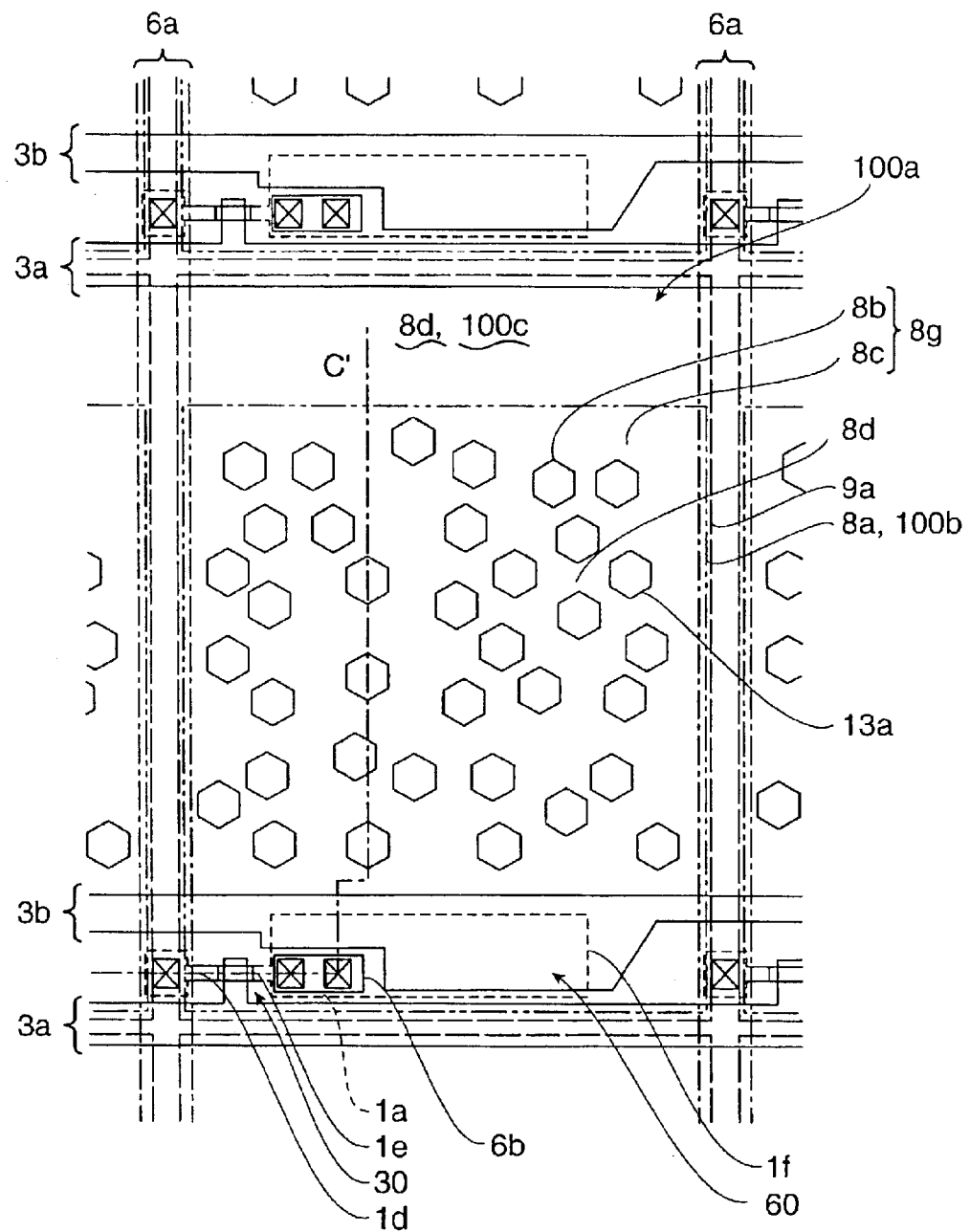
FIG. 4 is a plan view showing the configuration of each pixel in a TFT array substrate of the transflective liquid crystal device according to the present invention.
Figure 5:
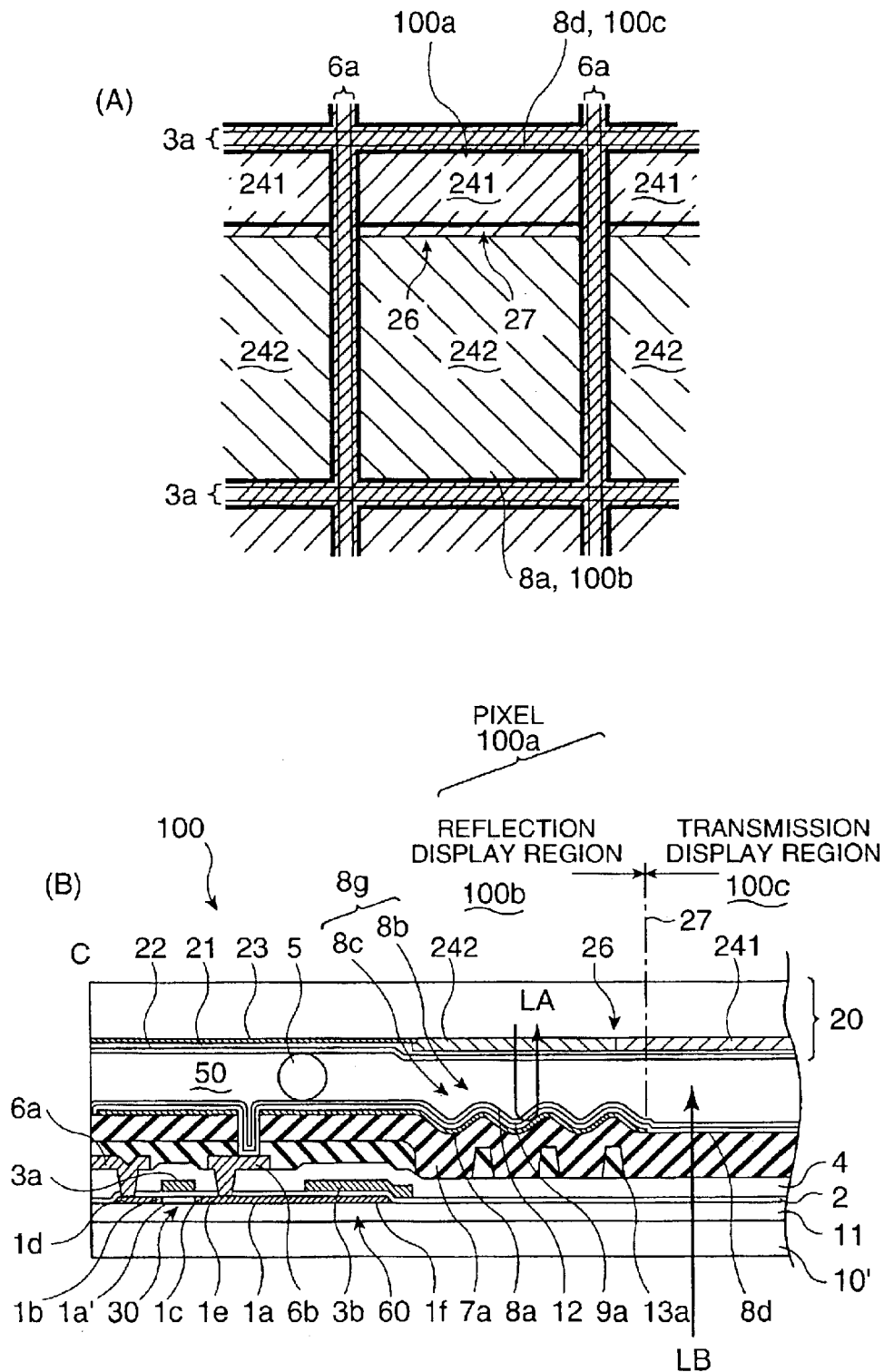
FIG. 5(A) is a schematic of a reflection display region and a transmission display region formed in the pixel in the transflective liquid crystal device according to a first exemplary embodiment of the present invention.
FIG. 5(B) is a sectional view of a part of the pixel taken along plane C-C' of FIG. 4.

FIG. 4 is a plan view of a plurality of a group of pixels neighboring each other in the TFT array substrate used in the transflective liquid crystal device of the present embodiment. FIG. 5(A) is a schematic of a reflection display region and a transmission display region formed in the pixel in the transflective liquid crystal device, and FIG. 5(B) is a sectional view of a part of the pixel taken along plane C-C' of FIG. 4.

In FIG. 4, pixel electrodes 9a (first transparent electrode) made of a plurality of transparent ITO (Indium Tin Oxide) films are formed in a matrix shape on a TFT array substrate 10, and TFTs to provide pixel 30 switching are connected to each pixel electrode 9a. Further, data lines 6a, scanning lines 3a, and capacitor lines 3b are formed along the longitudinal and horizontal boundary of the pixel electrode 9a, and the TFT 30 is connected with the data line 6a and the scanning line 3a. The data line 6a is electrically connected to a high density source region 1d of the TFT 30 through a contact hole, and the protrusion portion of scanning line 3a forms a gate electrode of the TFT 30.

In addition, the storage capacitor 60 is configured such that an extension portion 1f of a semiconductor film 1 to form the TFT to switch pixel 30 becomes a lower electrode 41, and the capacitor line 3b as an upper electrode overlaps the lower electrode 41.

The sectional view of the pixel 100a constructed as above taken along plane C-C' is shown in FIG. 5(B), and a foundation protecting film 11 made of a silicon oxide film (insulating film) of 300 to 500 nm in thickness is formed on the surface of a transparent substrate 10' as a base substance of the TFT array substrate 10, and a semiconductor film 1a is formed on the surface of the foundation protecting film 11, the semiconductor film 1a being in an island-shape of 30 to 100 nm in thickness. A gate insulating film 2 made of a silicon oxide film of about 50 to 150 nm in thickness, is formed on the surface of the semiconductor film 1a, and the scanning line 3a of 300 to 800 nm in thickness is formed on the surface of the gate insulating film 2. In the semiconductor film 1a, the region facing the scanning line 3a though the gate insulating film 2 is a channel region 1a'. In the channel region 1a', a source region having a low density source region 1b and a high density source region 1d is formed in a part thereof, and a drain region having a low density drain region 1c and a high density drain region 1e is formed in other part thereof.

An interlayer insulating film 4 made of a silicon oxide film of 300 to 800 nm in thickness, is formed on the surface of the TFT for switching pixel 30, and a surface protecting film (not shown) made of a silicon nitride film of 100 to 300 nm in thickness, may be formed on the surface of the interlayer insulating film 4. A data line 6a of 300 to 800 nm in thickness, is formed on the surface of the interlayer insulating film 4, and the data line 6a is electrically connected to a high density source region 1d through the contact hole formed on the interlayer insulating film 4. A drain electrode 6b formed together with the data line 6a is formed on the surface of the interlayer insulating film 4, and the drain electrode 6b is electrically connected to a high density drain region 1e through the contact hole formed on the interlayer insulating film 4.

An unevenness forming layer 13a made of a first photosensitive resin, is formed above interlayer insulating film 4 in a predetermined pattern, and an upper-layer insulating film 7a made of a second photosensitive resin, is formed on the surface of the unevenness forming layer 13a. In addition, a light reflecting film 8a made of an aluminum film, etc., is formed on the surface of the upper-layer insulating film 7a. Therefore, an unevenness pattern 8g having a concave portion 8c and a convex portion 8b is formed on the surface of the light reflecting film 8a by reflecting the unevenness of an unevenness forming layer 13a through the upper-layer insulating film 7a.

As shown in FIG. 4 and FIG. 5(A), the light reflecting layer 8a is formed on only one short side of a pair of short sides in the pixel 100a having substantially a rectangular shape, and a light transmitting window 8d is formed on the other short side without the light reflecting layer 8a. Due to such a structure, the substantially rectangular-shaped pixel 100a is configured such that the one short side having the light reflecting layer 8a formed thereon is a reflection display region 100b, and the other short side having the light transmitting window 8d formed thereon is a transmission display region 100c. In other words, a boundary portion 27 of the transmission display region 100c and the reflection display region 100b is extended parallel with a short side in a straight line inside the pixel 100a so that the three sides of the transmission display region 100c overlap the three sides of the pixel 100a.

In FIG. 5(B), the pixel electrode 9a made of an ITO film, is formed above the light reflecting film 8a. The pixel electrode 9a is directly laminated on the surface of the light reflecting film 8a, and the pixel electrode 9a is electrically connected to the light reflecting film 8a. Further, the pixel electrode 9a is electrically connected to the drain electrode 6b through the contact hole formed on the photosensitive resin layer 7a and the interlayer insulating film 4.

An oriented layer 12 made of polyimide film is formed on the surface of the pixel electrode 9a. The oriented film 12 is a film in which a rubbing-treatment is performed for the polyimide film.

Further, a capacitor line 3b as an upper electrode faces the extension portion 1f (lower electrode) extended from the high density drain region 1e through an insulating film (dielectric film) formed together with the gate insulating film 2 to form a storage capacitor 60.

Further, the TFT 30 preferably has an LDD structure as described above, or may have an off-set structure in which impurity ions are not injected in a region corresponding to a low density source region 1b and a low density drain region 1c. Further, the TFT 30 may be a self-aligned type TFT in which a high density of impurity ions are injected using a gate electrode (a part of a scanning line 3a) as a mask, and a high density of source and drain regions are formed in a self-matching manner.

Further, this exemplary embodiment has a single gate structure such that one gate electrode (scanning line 3a) of the TFT 30 is arranged between the source and the drain regions, but two or more gate electrodes can be arranged between them. In this case, an identical signal is applied on each gate electrode. As above, if the TFT 30 has a structure of a dual-gate (double gate) or a triple gate or more, it is possible to reduce or prevent leak current in the connection portion of the channel and the source-drain regions, and is possible to reduce current in off-state. If at least one of the gate electrodes is made in an LDD structure or in an off-set structure, the off-set current can be further reduced, and a stable switching device can be achieved.

Further, the substrate gap between the TFT array substrate 10 and the counter substrate 20 is defined by a gap material 5 dispersed on one of the substrates.

(Structure of a Counter Substrate)

The counter substrate 20 is configured such that a light shielding film 23, which is referred to as a black matrix or a black stripe, etc., is formed in the region facing the longitudinal and horizontal boundary portion of the pixel electrode 9a formed on the TFT array substrate 10, and the counter electrode 21 (a second electrode) made of an ITO film, is formed above the light shielding film 23. An oriented film 22 made of a polyimide film is formed above the counter electrode 21, and the oriented film 22 is a film in which a rubbing treatment is performed for the polyimide film.

Below the counter electrode 21 in the counter substrate 20, R, G, B color filters of 1 to several μm in thickness are formed in the region facing the pixel electrode 9a. However, when performing displaying in a reflection mode and displaying in a transmission mode in the transflective liquid crystal device 100, while the transmission display light is emitted by passing through the color filter just once, as indicated by arrow LB, the reflection display light passes through the color filter twice, as indicated by arrow LA. Due to the above, in this exemplary embodiment, a color filter for reflection display 242 with a narrow chromaticity region is formed in a reflection display region 100b having a light reflecting film 8a formed on the surface of the counter substrate 20, and a color filter for transmission display 241 with a wide chromaticity region is formed in a transmission display region 100c having a light transmitting window 8d formed on the surface of the counter substrate 20.

In the pixel 100a, a boundary portion 26 of the color filter for reflection display 242 and the color filter for transmission display 241 is extended parallel with the short side of the pixel 100a since a pixel 100a is constructed such that one short side having the light reflecting layer 8a formed thereon is a reflection display region 100b, and the other short side having the light transmitting window 8d formed thereon is a transmission display region 100c.

Further, the boundary portion 26 of the color filter for reflection display 242 and the color filter for transmission display 241 is located in the reflection display region 100b beyond the boundary portion 27 of the reflection display region 100b and the transmission display region 100c. In the related art, a light shielding film is formed in the boundary portion 26 of the color filter for reflection display 242 and the color filter for transmission display 241, but this exemplary embodiment does not use such light shielding film.

Such a counter substrate 20 can be manufactured by forming the light shielding film 23 by using a photolithography technology, forming the color filter for reflection display 242 and the color filter for transmission display 241 by using a photolithography technology, a flexographic printing or ink jet printing, and then, forming the counter electrode 21 and the oriented film 22.

(Operation and Effect of the Exemplary Embodiment)

In an electronic apparatus having the transflective liquid crystal device 100 constructed as above, a display is made in a reflection mode by using a reflection display light, as indicated by arrow LA, in a waiting state, while in its used state, a display is also made in a transmission mode in addition to the reflection mode by lighting a back light and using a transmission display light, as indicated by arrow LB.

In this exemplary embodiment, corresponding to such used state, the boundary portion 26 of the color filter for transmission display 241 and the color filter for reflection display 242 is arranged in the reflection display region 100b. Due to such an arrangement, the boundary portion 26 of the color filters is not extended over the transmission display region 100c, and the color filter for transmission display 241 is appropriately formed. Therefore, even though the color filters 241, 242 are overlapped in the boundary portion 26 of the color filter for transmission display 241 and the color filter for reflection display 242, or a gap is made between the color filters 241, 242, when a display is made in a transmission mode in addition to in a reflection mode, the boundary portion 26 of the color filters does not affect the displayed image. Therefore, it is not necessary to form a light shielding film in the boundary portion 26 of the color filter for transmission display 241 and the color filter for reflection display 242 on the counter substrate 20, as a result, the image can be displayed with a sufficient quantity of light.

Further, in this exemplary embodiment, a boundary portion 27 of the transmission display region 100c and the reflection display region 100b is extended parallel with a short side inside a pixel 100a in a straight line so that three sides of the transmission display region 100c overlap three sides of the pixel 100a. Due to such a structure, since the boundary portion 26 of the color filter for transmission display 241 and the color filter for reflection display 242 is made the shortest, the effect of the boundary portion 26 with unstable coloring, can be reduced or suppressed to a minimum.

[Second Exemplary Embodiment]

Figure 6:
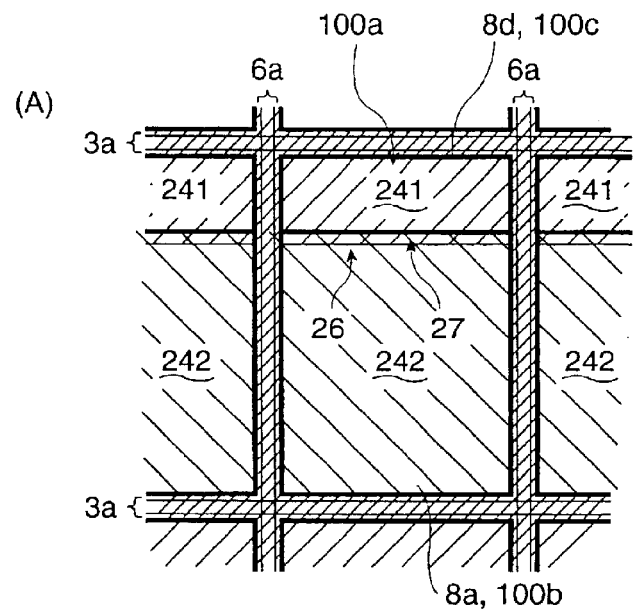
FIG. 6(A) is schematic of a reflection display region and a transmission display region formed in the pixel in the transflective liquid crystal device according to a second exemplary embodiment of the present invention.
FIG. 6(B) is a sectional view of a part of the pixel taken along plane C-C' of FIG. 4.
Figure 6:
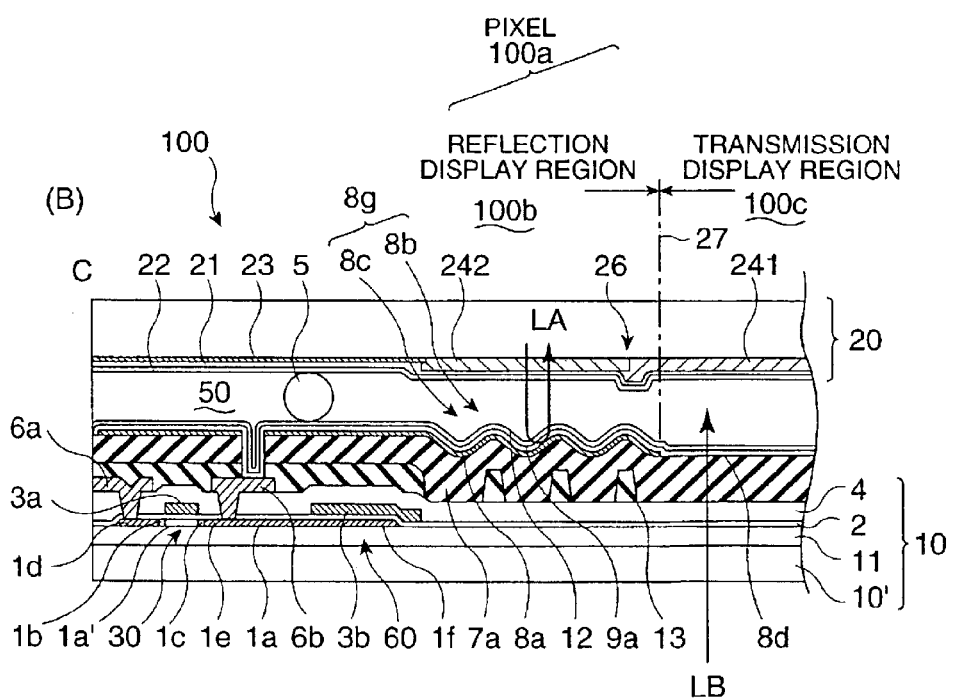

FIG. 6(A) is a schematic of a reflection display region and a transmission display region formed in the pixels of the transflective liquid crystal device according to a second exemplary embodiment, and FIG. 6(B) is a sectional view of a part of the pixel taken along plane C-C' of FIG. 4. Further, in the configuration of this exemplary embodiment and any configuration to be described below, a basic structure is the same as that of the first exemplary embodiment. Therefore, the common elements will be designated with the same numeral so as to omit the description thereof, and only a counter substrate which is a feature of each exemplary embodiment is explained.

On the surface of a counter substrate 20 according to the exemplary embodiment as shown in FIGS. 6(A) and 6(B), the same as in the first exemplary embodiment, a color filter for reflection display 242 with a narrow chromaticity region is formed in a reflection display region 100b having a light reflecting film 8a formed thereon, and a color filter for transmission display 241 with a wide chromaticity region is formed in a transmission display region 100c having a light transmitting window 8d formed thereon. In the pixel 100a, a boundary portion 26 of the color filter for reflection display 242 and the color filter for transmission display 241 is extended parallel with the short side of the pixel 100a in a straight line since one short side having the light reflecting layer 8a formed thereon is a reflection display region 100b, and the other short side having the light transmitting window 8d formed thereon is a transmission display region 100c.

Further, also in this exemplary embodiment, the boundary portion 26 of the color filter for reflection display 242 and the color filter for transmission display 241 is located in the reflection display region 100b beyond the boundary portion 27 of the reflection display region 100b and the transmission display region 100c.

In the first exemplary embodiment, the color filter for reflection display 242 and the color filter for transmission display 241 are formed not to overlap with each other in the boundary portion 26, and a gap is not generated between them. However, in this exemplary embodiment, the color filter for reflection display 242 and the color filter for transmission display 241 are partially overlapped with each other in the boundary portion 26.

Further, in the related art, a light shielding film is formed in the boundary portion 26 of the color filter for reflection display 242 and the color filter for transmission display 241, but this exemplary embodiment does not use such light shielding film.

In the transflective liquid crystal device 100 structured as above, the boundary portion 26 of the color filter for reflection display 242 and the color filter for transmission display 241 is located in the reflection display region 100b beyond the boundary portion 27 of the reflection display region 100b and the transmission display region 100c, and the color filter for reflection display 242 and the color filter for transmission display 241 partially overlap each other in the boundary portion 26. Due to such a structure, when a display is made in a reflection mode by using a reflection display light, as indicated by arrow LA, in a waiting state, the leakage of light never occurs.

Further, since the boundary portion 26 of the color filter for transmission display 241 and the color filter for reflection display 242 is located in the reflection display region 100b, the boundary portion 26 of the color filters is not extended over the transmission display region 100c, and the color filter for transmission display 241 is appropriately formed. Therefore, in the reflection display region 100b, even though the color filters 241, 242 are overlapped in the boundary portion 26 of the color filter for transmission display 241 and the color filter for reflection display 242, the boundary portion 26 of the color filters does not affect the displayed image when a display is made in a transmission mode in addition to in a reflection mode. Therefore, it is not necessary to form a light shielding film in the boundary portion 26 of the color filter for transmission display 241 and the color filter for reflection display 242 on the counter substrate 20, and the image can be displayed with a sufficient quantity of light.

[Third Exemplary Embodiment]

Figure 7:
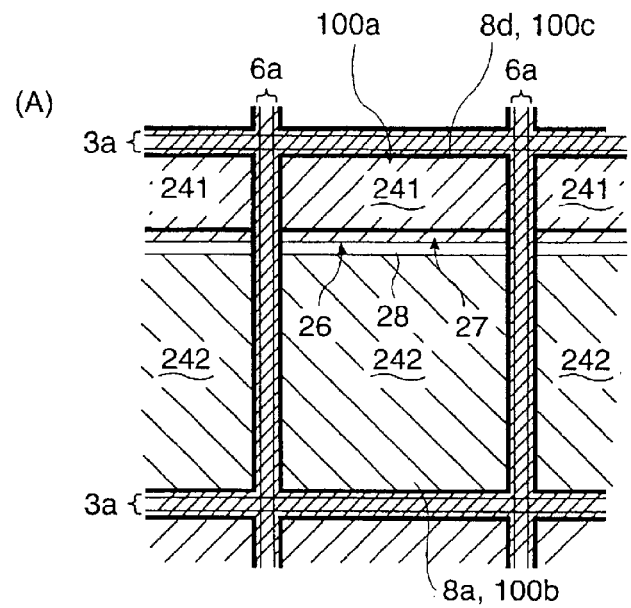
FIG. 7(A) is a schematic of a reflection display region and a transmission display region formed in the pixel in the transflective liquid crystal device according to a third exemplary embodiment of the present invention.
FIG. 7(B) is a sectional view of a part of the pixel taken along plane C-C' of FIG. 4.
Figure 7:
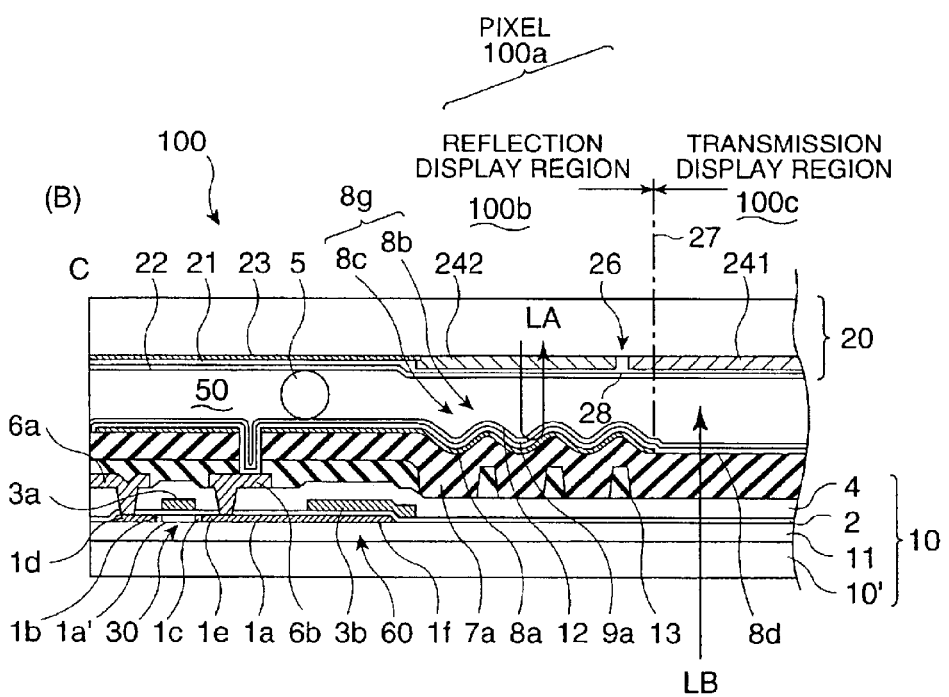

FIG. 7(A) is a typical explanatory view of reflection display region and a transmission display region formed in the pixel in the transflective liquid crystal device according to a third exemplary embodiment, and FIG. 7(B) is a sectional view of a part of the pixel taken along plane C-C' of FIG. 4.

On the surface of a counter substrate 20 according to the exemplary embodiment as shown in FIGS. 7(A) and 7(B), the same as in the first exemplary embodiment, a color filter for reflection display 242 with a narrow chromaticity region is formed in a reflection display region 100b having a light reflecting film 8a formed thereon, and a color filter for transmission display 241 with a wide chromaticity region is formed in a transmission display region 100c having a light transmitting window 8d formed thereon. In the pixel 100a, a boundary portion 26 of the color filter for reflection display 242 and the color filter for transmission display 241 is extended parallel with the short side of the pixel 100a in a straight line since one short side having the light reflecting layer 8a formed thereon is a reflection display region 100b, and the other short side having the light transmitting window 8d formed thereon is a transmission display region 100c.

Further, also in this exemplary embodiment, the boundary portion 26 of the color filter for reflection display 242 and the color filter for transmission display 241 is located in the reflection display region 100b beyond the boundary portion 27 of the reflection display region 100b and the transmission display region 100c.

In the first exemplary embodiment, the color filter for reflection display 242 and the color filter for transmission display 241 are formed not to overlap each other in the boundary portion 26, and a gap is not made between them. However, in this exemplary embodiment, a gap 28 is made in the boundary portion 26 between the color filter for reflection display 242 and the color filter for transmission display 241.

Further, in the related art, a light shielding film is formed in the boundary portion 26 of the color filter for reflection display 242 and the color filter for transmission display 241, but this exemplary embodiment does not use such light shielding film.

In the transflective liquid crystal device 100 structured as above, the boundary portion 26 of the color filter for reflection display 242 and the color filter for transmission display 241 is located in the reflection display region 100b beyond the boundary portion 27 of the reflection display region 100b and the transmission display region 100c, and a gap 28 is made between the color filter for reflection display 242 and the color filter for transmission display 241 in the boundary portion 26. However, when a display is made in a reflection mode by using a reflection display light, as indicated by arrow LA, in a waiting state, since the quantity of the external light that is incident through the gap 28 and is directly emitted out through the gap 28 without passing through the color filter 242, is very small, the quality of displayed images is rarely affected.

Further, since the boundary portion 26 of the color filter for transmission display 241 and the color filter for reflection display 242 is located in the reflection display region 100b, the boundary portion 26 of the color filters is not extended over the transmission display region 100c, and the color filter for transmission display 241 is appropriately formed. Therefore, in the reflection display region 100b, even though the gap 28 is made between the color filters 241, 242, in the boundary portion 26 of the color filter for transmission display 241 and the color filter for reflection display 242, since the leakage of light rarely occurs through the gap 28, the boundary portion 26 of the color filters does not affect the displayed image when a display is made in a transmission mode in addition to in a reflection mode. Therefore, it is not necessary to form a light shielding film in the boundary portion 26 of the color filter for transmission display 241 and the color filter for reflection display 242 on the counter substrate 20, and the image can be displayed with a sufficient quantity of light.

Further, in this exemplary embodiment, a boundary portion 27 of the transmission display region 100c and the reflection display region 100b is extended parallel with a short side inside a pixel 100a in a straight line so that the three sides of the transmission display region 100c overlap the three sides of the pixel 100a. Therefore, since the boundary portion 26 of the color filter for transmission display 241 and the color filter for reflection display 242 is made the shortest, the effect of the boundary portion 26 with unstable coloring, can be reduced or suppressed to a minimum.

[Fourth Exemplary Embodiment]

Figure 8:
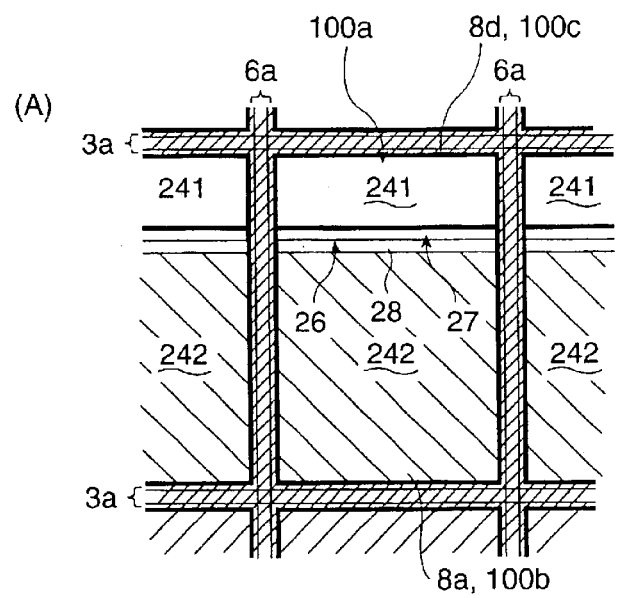
FIG. 8(A) is a schematic of a reflection display region and a transmission display region formed in the pixel in the transflective liquid crystal device according to a fourth exemplary embodiment of the present invention.
FIG. 8(B) is a sectional view of a part of the pixel taken along plane C-C' of FIG. 4.
Figure 8:
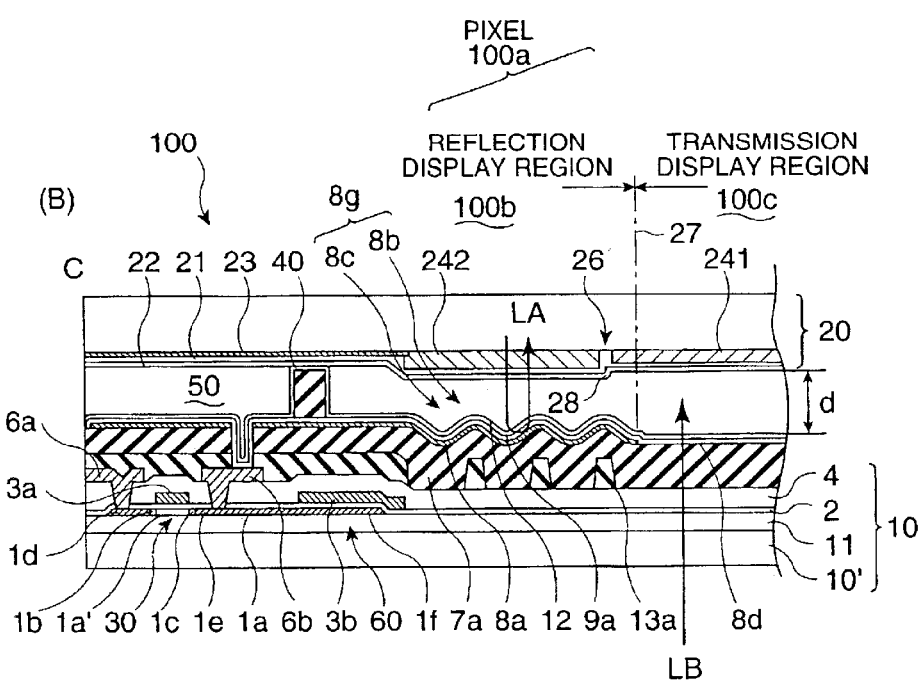

FIG. 8(A) is a schematic of a reflection display region and a transmission display region formed in the pixel of the transflective liquid crystal device according to a fourth exemplary embodiment, and FIG. 8(B) is a sectional view of a part of the pixel taken along plane C-C' of FIG. 4.

On the surface of a counter substrate 20 according to this exemplary embodiment as shown in FIGS. 8(A) and 8(B), the same as in the third exemplary embodiment, a color filter for reflection display 242 with a narrow chromaticity region is formed in a reflection display region 100b having a light reflecting film 8a formed thereon, and a color filter for transmission display 241 with a wide chromaticity region is formed in a transmission display region 100c having a light transmitting window 8d formed thereon. In the pixel 100a, a boundary portion 26 of the color filter for reflection display 242 and the color filter for transmission display 241 is extended parallel with the short side of the pixel 100a since one short side having the light reflecting film 8a formed thereon is a reflection display region 100b, and the other short side having the light transmitting window 8d formed thereon is a transmission display region 100c.

Further, in this exemplary embodiment as the same as in the third exemplary embodiment, the boundary portion 26 of the color filter for reflection display 242 and the color filter for transmission display 241 is located in the reflection display region 100b beyond the boundary portion 27 of the reflection display region 100b and the transmission display region 100c. In this regard, a gap 28 is made between the color filter for reflection display 242 and the color filter for transmission display 241 in the boundary portion 26.

Further, in the related art, a light shielding film is formed in the boundary portion 26 of the color filter for reflection display 242 and the color filter for transmission display 241. However, this exemplary embodiment does not use such light shielding film.

Further, in this exemplary embodiment, a thin color material with a wide chromaticity region is used for the color filter for transmission display 241, and a thick color material with a narrow chromaticity region is used for the color filter for reflection display 242. Due to such a structure, the layer thickness "d" of the liquid crystal layer 50 in the reflection display region 100b is considerably thinner than the layer thickness "d" of the liquid crystal layer 50 in the transmission display region 100c.

Further, in this exemplary embodiment, the interval between the TFT array substrate 10 and the counter substrate 20 is defined by a columnar protrusion 40 formed on the TFT array substrate 10, and gap material is not dispersed between the TFT array substrate 10 and the counter substrate 20.

In the transflective liquid crystal device 100 structured as above, when performing displaying in a reflection mode using a reflection display light, as indicated by arrow LA, in a waiting state, since the quantity of the external light that is incident through the gap 28 and is directly emitted out through the gap 28, is very small, the quality of displayed images is rarely affected, and the like, and therefore, the same effects as in the third exemplary embodiment can be achieved.

Further, in this exemplary embodiment, the thickness of the color filter for transmission display 241 and the color filter for reflection display 242 is changed, and the layer thickness "d" of the liquid crystal layer 50 in the reflection display region 100b is considerably thinner than the layer thickness "d" of the liquid crystal layer 50 in the transmission display region 100c. Therefore, even though the reflection display light passes through the liquid crystal layer 50 twice, while the transmission display light is emitted by passing through the liquid crystal layer 50 just once, the exemplary embodiment can enhance or optimize the retardation (Δn·d) in both of the transmission display light and the reflection display light so as to perform a high quality display.

Since the interval between the TFT array substrate 10 and the counter substrate 20 is defined by the columnar protrusion 40 formed on the TFT array substrate 10, and a gap material is not dispersed between the TFT array substrate 10 and the counter substrate 20, a problem in which a device does not fulfill its function due to the gap material remains in a concave portion does not occur, even though the unevenness exists on the counter substrate 20 due to a layer-thickness adjusting layer 25. Therefore, since the preciseness of the interval between the TFT array substrate 10 and the counter substrate 20 can be well defined, and the retardation (Δn·d) can be enhanced or optimized, accordingly a display can have a high quality.

[Fifth Exemplary Embodiment]

Figure 9:
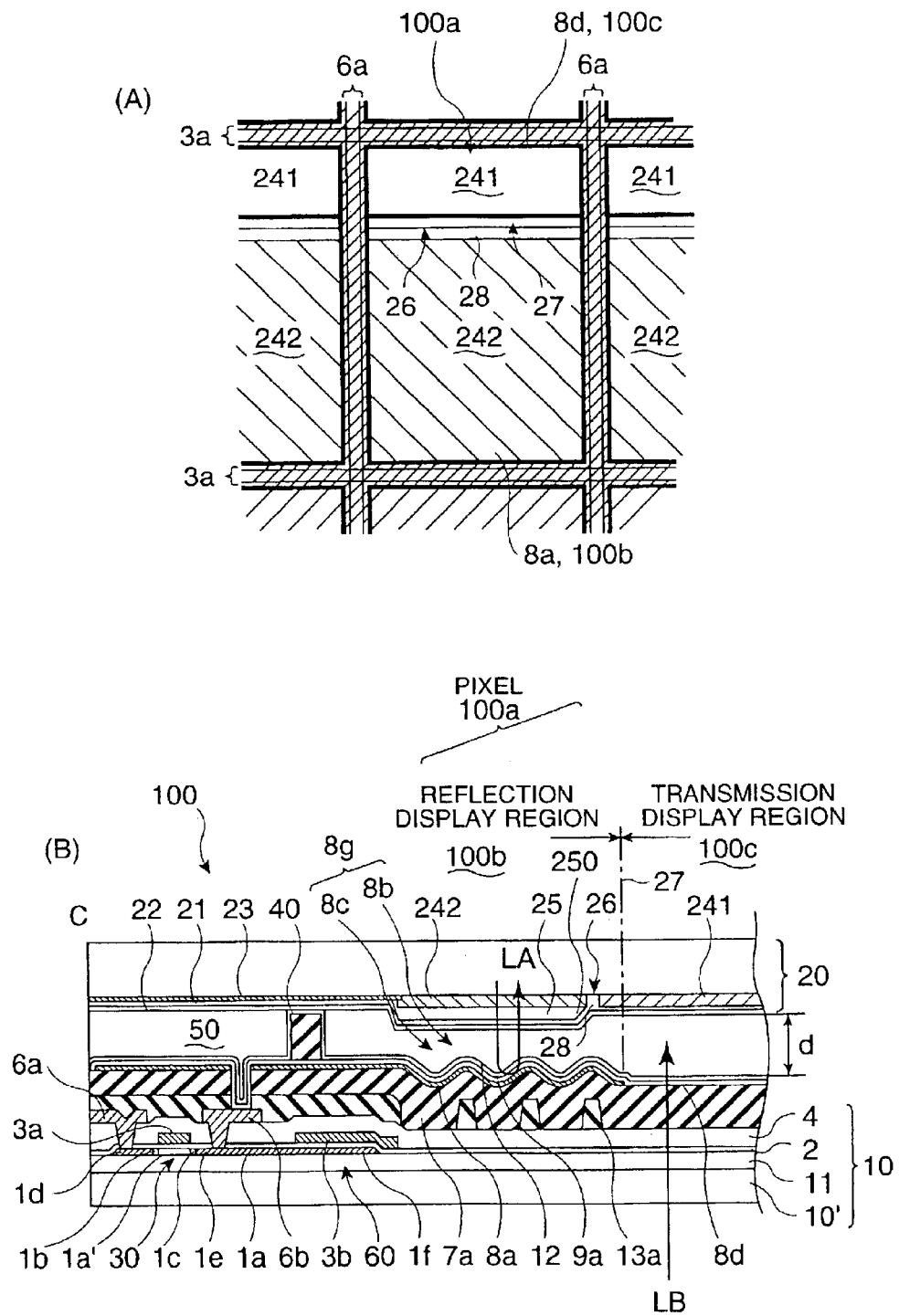
FIG. 9(A) is a schematic of a reflection display region and a transmission display region formed in the pixel in the transflective liquid crystal device according to a fifth exemplary embodiment of the present invention.
FIG. 9(B) is a sectional view of a part of the pixel taken along plane C-C' of FIG. 4.

FIG. 9(A) is a typical explanatory view of a reflection display region and a transmission display region are formed in the pixel of the transflective liquid crystal device according to a fifth exemplary embodiment, and FIG. 9(B) is a sectional view of a part of the pixel taken along plane C-C' of FIG. 4.

On the surface of a counter substrate 20 according to this exemplary embodiment as shown in FIGS. 9(A) and 9(B), the same as in the third exemplary embodiment, a color filter for reflection display 242 with a narrow chromaticity region is formed in a reflection display region 100b having a light reflecting film 8a formed thereon, and a color filter for transmission display 241 with a wide chromaticity region is formed in a transmission display region 100c having a light transmitting window 8d formed thereon. Further, in the pixel 100a, a boundary portion 26 of the color filter for reflection display 242 and the color filter for transmission display 241 is extended parallel with the short side of the pixel 100a since one short side having the light reflecting layer 8a formed thereon is a reflection display region 100b, and the other short side having the light transmitting window 8d formed thereon is a transmission display region 100c.

Further, also in this exemplary embodiment, the boundary portion 26 of the color filter for reflection display 242 and the color filter for transmission display 241 is located in the reflection display region 100b beyond the boundary portion 27 of the reflection display region 100b and the transmission display region 100c. A gap 28 is made between the color filter for reflection display 242 and the color filter for transmission display 241 in the boundary portion 26.

Further, in the related art, a light shielding film is formed in the boundary portion 26 of the color filter for reflection display 242 and the color filter for transmission display 241, but in this exemplary embodiment, the light shielding film is not formed therein.

Further, in this exemplary embodiment, a layer-thickness adjusting layer 25, being 2 to 4 μm in thickness, made of a transparent layer, such as acryl resin or polyimide resin, etc., is formed on the interlayer of the color filter for reflection display 242 and a counter electrode 21 on the surface of the counter substrate 20. Due to such a structure, the layer thickness "d" of the liquid crystal layer 50 in the reflection display region 100b is thinner than the layer thickness "d" of the liquid crystal layer 50 in the transmission display region 100c. An end portion 250 of the layer-thickness adjusting layer 25 is tapered in the surface, and such a tapered end portion 250 is located inside the reflection display region 100b.

Further, in this exemplary embodiment, the interval between the TFT array substrate 10 and the counter substrate 20 is defined by a columnar protrusion 40 formed on the TFT array substrate 10 and having a height of 2 to 3 μm, and a gap material is not dispersed between the TFT array substrate 10 and the counter substrate 20.

In the transflective liquid crystal device 100 structured as above, when a display is made in a reflection mode by using a reflection display light as indicated by arrow LA in a waiting state, since the quantity of the external light that is incident from the gap 28 and is directly emitted out through the gap 28 is very small, the quality of displayed images is rarely affected, and the like. Accordingly, the same effects as in the third exemplary embodiment can be achieved.

Further, in this exemplary embodiment, the layer-thickness adjusting layer 25 is formed on the counter substrate 20, and the layer thickness "d" of the liquid crystal layer 50 in the reflection display region 100b becomes considerably thinner than the layer thickness "d" of the liquid crystal layer 50 in the transmission display region 100c. Therefore, the retardation (Δn·d) can be optimized in both of the transmission display light and the reflection display light so as to perform a high quality display.

Further, in this exemplary embodiment, the end portion 250 of the layer-thickness adjusting layer 25 has a tapered surface, and the layer thickness of the liquid crystal layer 50 is deviated from an appropriate value in the portion, but since the end portion 250 is located inside the reflection display region 100b, the deviation of the layer thickness does not affect the quality of display when performing displaying in a transmission mode.

Further, the layer-thickness adjusting layer 25 is formed on the counter substrate 20, that is, on the substrate in which a TFT to provide pixel 30 switching is not formed, and the layer thickness "d" of the liquid crystal layer 50 in the reflection display region 100b becomes thinner than the layer thickness "d" of the liquid crystal layer 50 in the transmission display region 100c. Due to such a structure, if the layer-thickness adjusting layer 25 is provided, the exposure preciseness in a photolithography process to form the TFT 30 on the TFT array substrate 10 is not lowered. Therefore, the present invention can provide a transflective liquid crystal device 100 having a high reliability and a high quality of display.

Further, since the interval between the TFT array substrate 10 and the counter substrate 20 is defined by the columnar protrusion 40 formed on the TFT array substrate 10, and a gap material is not dispersed between the TFT array substrate 10 and the counter substrate 20, even though the unevenness exists on the counter substrate 20 due to a layer-thickness adjusting layer 25, the problem in which a device can not fulfill its function due to gap material remaining in a concave portion, does not occur. Therefore, since the preciseness of the interval between the TFT array substrate 10 and the counter substrate 20 can be well defined, and the retardation (Δn·d) can be enhanced or optimized, accordingly a display can have a high quality.

[Sixth Exemplary Embodiment]

Figure 10:
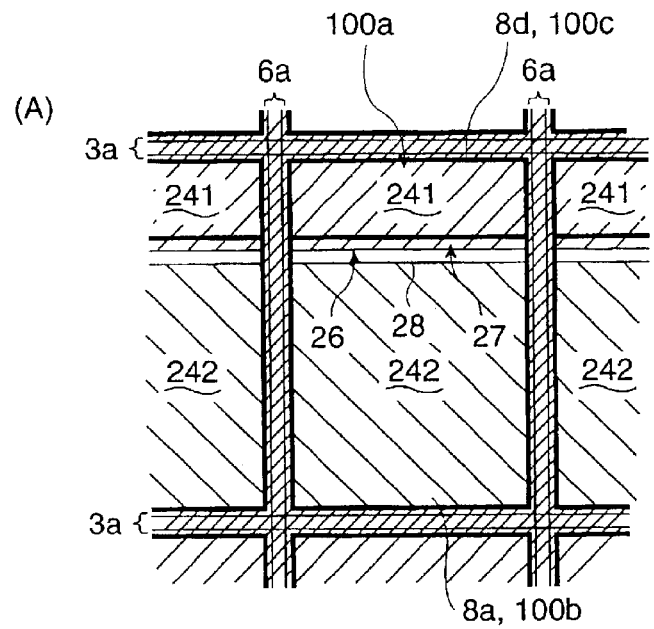
FIG. 10(A) is a schematic of a reflection display region and a transmission display region formed in the pixel in the transflective liquid crystal device according to a sixth exemplary embodiment of the present invention.
FIG. 10(B) is a sectional view of a part of the pixel taken along plane C-C' of FIG. 4.
Figure 10:
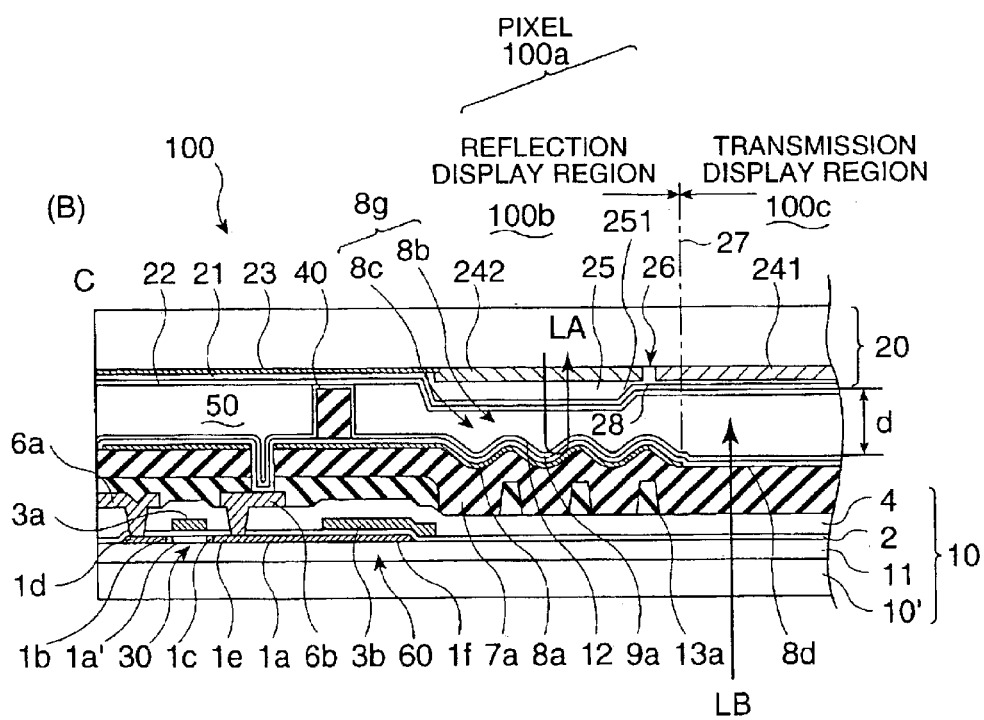

FIG. 10(A) is a schematic of a reflection display region and a transmission display region are formed in the pixel in the transflective liquid crystal device according to a sixth exemplary embodiment, and FIG. 10(B) is a sectional view of a part of the pixel taken along plane C-C' of FIG. 4.

On the surface of a counter substrate 20 according to the exemplary embodiment as shown in FIGS. 10(A) and 10(B), as the same as in the third exemplary embodiment, a color filter for reflection display 242 with a narrow chromaticity region is formed in a reflection display region 100b having a light reflecting film 8a formed thereon, and a color filter for transmission display 241, with a wide chromaticity region, is formed in a transmission display region 100c having a light transmitting window 8d formed thereon. In the pixel 100a, a boundary portion 26 of the color filter for reflection display 242 and the color filter for transmission display 241 is extended parallel with the short side of the pixel 100a since one short side having the light reflecting layer 8a formed thereon is a reflection display region 100b, and the other short side having the light transmitting window 8d formed thereon is a transmission display region 100c.

Further, also in this exemplary embodiment, the boundary portion 26 of the color filter for reflection display 242 and the color filter for transmission display 241 is located in the reflection display region 100b beyond the boundary portion 27 of the reflection display region 100b and the transmission display region 100c. In this regard, a gap 28 is made between the color filter for reflection display 242 and the color filter for transmission display 241 in the boundary portion 26.

Further, in the related art, a light shielding film is formed in the boundary portion 26 of the color filter for reflection display 242 and the color filter for transmission display 241, this exemplary embodiment does not use such light shielding film.

Further, in this exemplary embodiment, a layer-thickness adjusting layer 25 made of a transparent layer, such as acryl resin or polyimide resin, etc., is formed on the interlayer with a counter electrode 21 and the counter substrate 20, and the layer-thickness adjusting layer 25 is thick in the reflection display region 100b, and is thin in the transmission display region 100c. Due to such a structure, the layer thickness "d" of the liquid crystal layer 50 in the reflection display region 100b is thinner than the layer thickness "d" of the liquid crystal layer 50 in the transmission display region 100c. In the layer-thickness adjusting layer 25, a step 251 is formed between a thick portion and a thin portion, but the step 251 is located inside the reflection display region 100b.

Further, in this exemplary embodiment, the interval between the TFT array substrate 10 and the counter substrate 20 is defined by a columnar protrusion 40 formed on the TFT array substrate 10, and a gap material is not dispersed between the TFT array substrate 10 and the counter substrate 20.

In the transflective liquid crystal device 100 structured as above, when a display is made in a reflection mode by using a reflection display light, as indicated by arrow LA, in a waiting state, since the quantity of the external light that is incident from the gap 28 and is directly emitted out through the gap 28 is very small, the quality of displayed images is rarely affected, etc. Accordingly, the same effects as in the third exemplary embodiment can be achieved.

Further, in this exemplary embodiment, the layer-thickness adjusting layer 25 is formed on the counter substrate 20, and the layer thickness "d" of the liquid crystal layer 50 in the reflection display region 100b becomes considerably thinner than the layer thickness "d" of the liquid crystal layer 50 in the transmission display region 100c. Therefore, the retardation (Δn·d) can be enhanced or optimized in both of the transmission display light and the reflection display light so as to perform a high quality display.

Further, even though the tapered-shape step 251 exists between a thick portion and a thin portion on the layer-thickness adjusting layer 25, and the layer thickness of the liquid crystal layer 50 in the portion is deviated from an appropriate value, such a step 251 is located inside the reflection display region 100b, and thus the deviation of the layer thickness does not affect the quality of display when performing displaying in a transmission mode.

Further, the layer-thickness adjusting layer 25 is formed on the counter substrate 20, that is, on the substrate in which a TFT for switching pixel 30 is not formed, and the layer thickness "d" of the liquid crystal layer 50 in the reflection display region 100b becomes thinner than the layer thickness "d" of the liquid crystal layer 50 in the transmission display region 100c. Due to such a structure, even if the layer-thickness adjusting layer 25 is provided, the exposure preciseness in a photolithography process to form the TFT 30 on the TFT array substrate 10 is not lowered. Therefore, the transflective liquid crystal device 100 having a high reliability and a high quality of display can be provided.

Further, since the interval between the TFT array substrate 10 and the counter substrate 20 is defined by the columnar protrusion 40 formed on the TFT array substrate 10, and a gap material is not dispersed between the TFT array substrate 10 and the counter substrate 20, even though the unevenness exists on the counter substrate 20 due to a layer-thickness adjusting layer 25, a problem in which a device can not fulfill its function due to the gap material remaining in a concave portion, does not occur. Therefore, since the preciseness of the interval between the TFT array substrate 10 and the counter substrate 20 can be well defined, and the retardation (Δn·d) can be enhanced or optimized, accordingly a display can have a high quality.

[Other Exemplary Embodiments]

The fourth, fifth, and sixth exemplary embodiments are structured respectively to add respective components in addition to the structure of the third exemplary embodiment, but the configuration described in the fourth, fifth, and sixth exemplary embodiments can be added to the first and second exemplary embodiments.

Further, in the fourth, fifth, and sixth exemplary embodiments, examples of adjusting the substrate gap by the columnar protrusion 40 are illustrated in comparison with the liquid crystal device having the layer-thickness adjusting layer 25 formed on the counter substrate 20, the substrate gap may be adjusted by the columnar protrusion 40 in comparison with the liquid crystal device having the layer-thickness adjusting layer 25 formed on the TFT array substrate 10.

Further, the columnar protrusion 40 can be formed on the counter substrate 20.

Further, in the above exemplary embodiments, an example of using a TFT as an active device to provide pixel switching is illustrated, a thin film diode device (TFD device), such as a Metal Insulator Metal device (MIM device), etc., as an active device can be employed in the same way.

[Application of the Transflective Liquid Crystal Device in an Electronic Apparatus]

The transflective liquid crystal device 100 structured as above can be used as a display unit of various electronic apparatus, and the examples are explained with reference to FIGS. 11–13.

Figure 11:
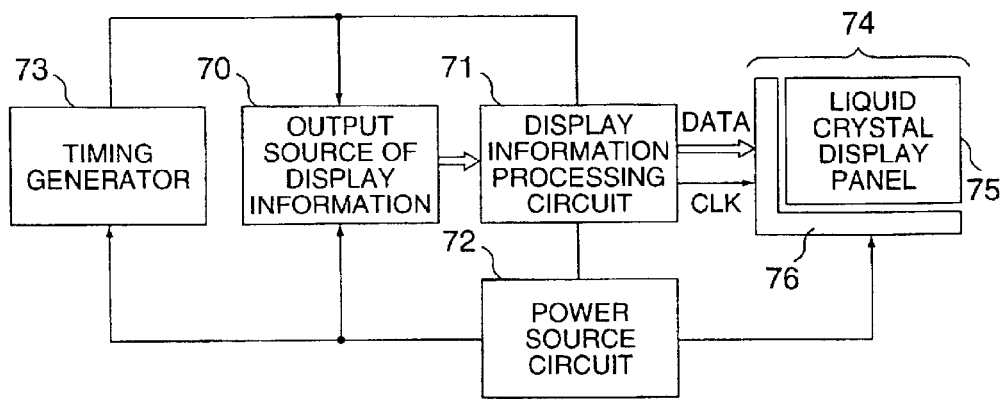
FIG. 11 is a schematic of the circuits of the electronic apparatus using the transflective liquid crystal device according to the present invention as a display unit.

FIG. 11 is a schematic of the circuits of the electronic apparatus employing the transflective liquid crystal device according to the present invention as a display unit.

In FIG. 11, the electronic apparatus includes an output source of display information 70, a display information processing circuit 71, a power source circuit 72, a timing generator 73, and a liquid crystal device 74. In addition, the liquid crystal device 74 includes a liquid crystal display panel 75 and a driving circuit 76. As the liquid crystal device 74, the transflective liquid crystal device 100 as described above can be used.

The output source of display information 70 includes a memory, such as an ROM (Read Only Memory), an RAM (Random Access Memory), etc., a storage unit, such as various disks, etc., and a tuning circuit to tune-output digital image signals, or the like, and display information, such as image signals in a predetermined format, is supplied to the display information processing circuit 71 according to various clock signals generated by the timing generator 73.

The display information processing circuit 71 includes related art, later developed or widely-known circuits, such as a serial-parallel conversion circuit, an amplification/inversion circuit, a rotation circuit, a gamma correction circuit, a clamp circuit, etc., for example, and performs the processing of input display information so as to supply the image signal to the driving circuit 76 along with the clock signal (CLK). The power source circuit 72 supplies a predetermined voltage to each component element.

Figure 12:
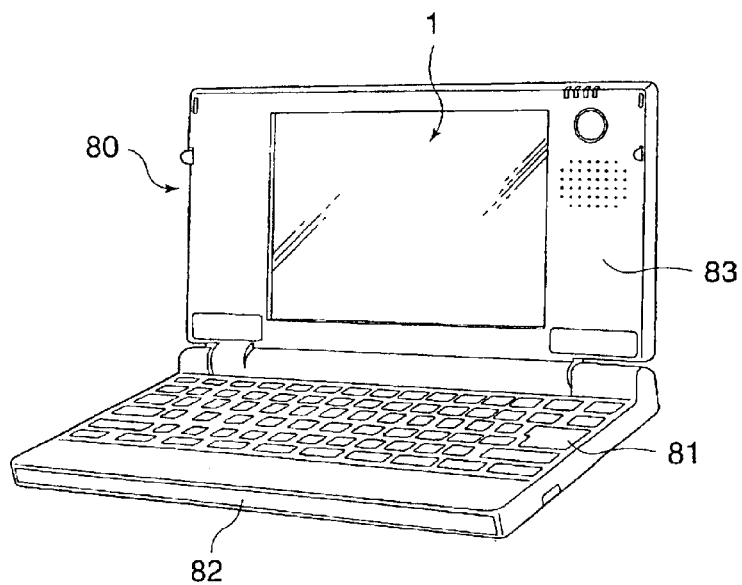
FIG. 12 is a schematic of a portable personal computer using the transflective liquid crystal device according to the present invention.

FIG. 12 illustrates a portable personal computer as one example of the electronic apparatus according to the present invention. The personal computer 80 includes a body unit 82 having a keyboard 81, and a liquid crystal display unit 83. The liquid crystal display unit 83 is structured to include the transflective liquid crystal device 100 as described above.

Figure 13:
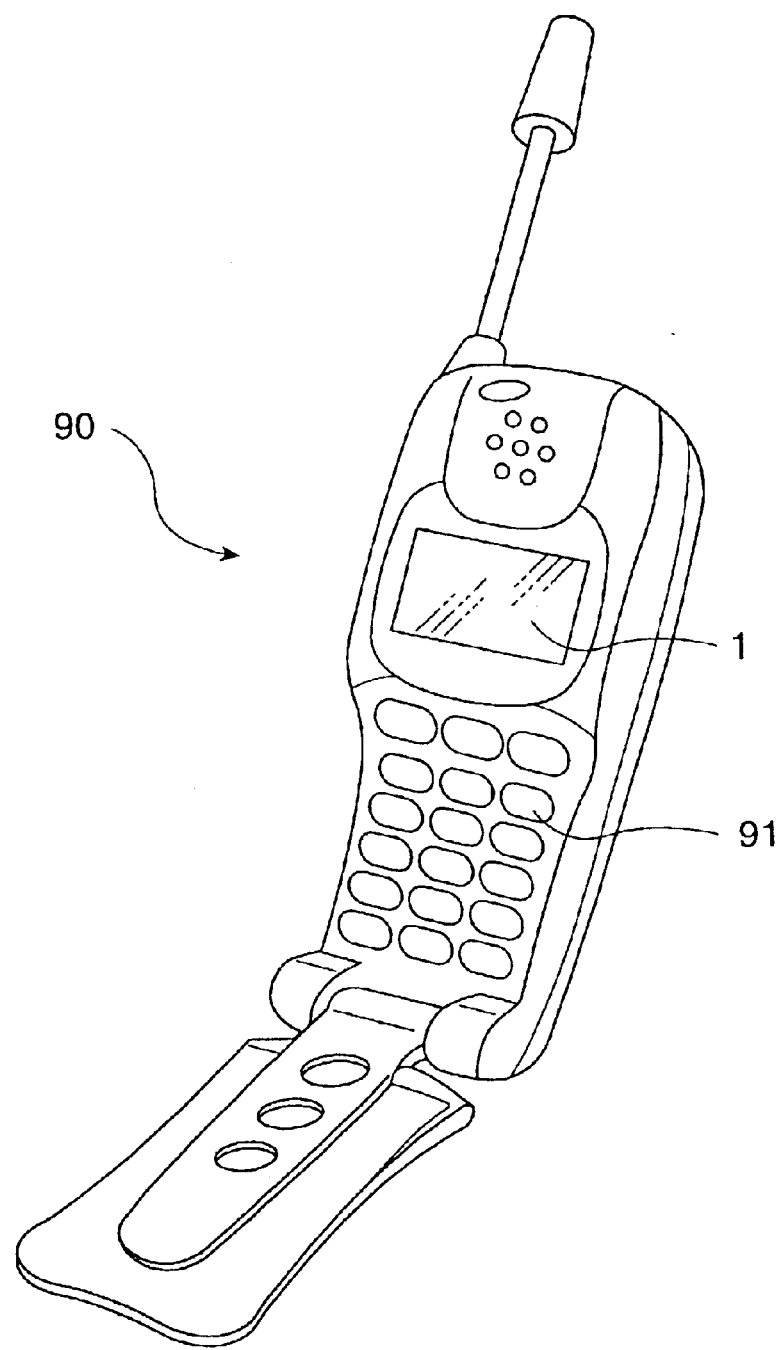
FIG. 13 is a schematic of a mobile phone using the transflective liquid crystal device according to the present invention.
Figure 14:
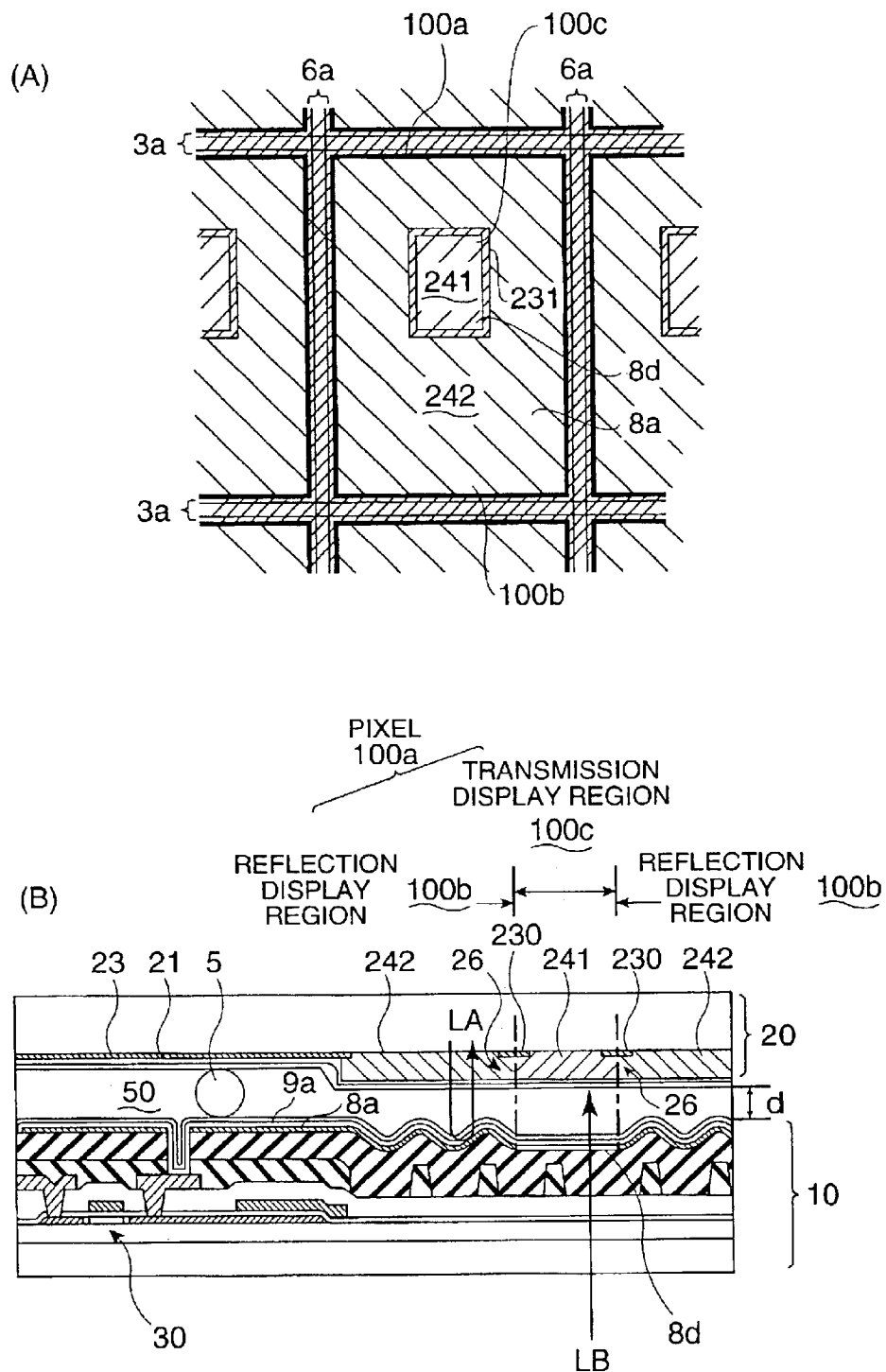
FIG. 14(A) is a schematic of a reflection display region and a transmission display region formed in a pixel in a related art transflective liquid crystal device.
FIG. 14(B) is a sectional view of the pixel.

FIG. 13 illustrates a mobile phone as another example of the electronic apparatus according to the present invention. The mobile phone 90 includes a plurality of manipulating buttons 91 and a display unit provided with the transflective liquid crystal device 100 as described above.

[Effects of the Invention]

As described above, as the transflective liquid crystal device according to the present invention correspondingly conforms to its form of usage and a boundary portion of the color filter for transmission display and the color filter for reflection display is located in the reflection display region, the color filter for transmission display is appropriately formed in the transmission display region. Therefore, even though the color filters overlap in the boundary portion of the color filter for transmission display and the color filter for reflection display, or a gap is made between the color filters, the boundary portion of the color filters does not affect the displayed image at the time used to also display in a transmission mode in addition to in a reflection mode. Therefore, since it is not necessary to form a light shielding film in the boundary portion of the color filter for transmission display and the color filter for reflection display on the second transparent substrate, the image can be displayed with a sufficient quantity of light.

What is claimed is:

1. A transflective liquid crystal device, comprising:
   a first transparent substrate having first transparent electrodes and pixel switching elements formed on a surface in a matrix;
   a second transparent substrate having second transparent electrodes formed on a surface, the second transparent electrodes facing the first transparent electrodes to form pixels;
   a liquid crystal layer held between the first transparent substrate and the second transparent substrate;
   a light reflecting layer, functioning as a reflection display region in one part of the pixels, and as a transmission display region in the remaining region of the pixels region, the light reflecting layer being formed on the first transparent substrate;
   a color filter for transmission display, formed in the transmission display regions on the second transparent substrate;
   a color filter for reflection display, formed in the reflection display regions on the second transparent substrate, a chromaticity region of the color filter for reflection display being narrower than a chromaticity region of the color filter for transmission display, a boundary portion of the color filter for transmission display and the color filter for reflection display being located in the reflection display region.

2. The transflective liquid crystal device according to claim 1, the color filter for transmission display overlapping the color filter for reflection display in the boundary portion of the color filter for transmission display and the color filter for reflection display.

3. The transflective liquid crystal device according to claim 1, a gap being formed between the color filter for transmission display and the color filter for reflection display in the boundary portion of the color filter for transmission display and the color filter for reflection display.

4. The transflective liquid crystal device according to claim 1, the pixel having substantially a rectangular plane shape, and the boundary portion of the transmission display region and the reflection display region extending in a straight line inside the pixel so that three sides of the transmission display region overlap three sides of the pixel.

5. The transflective liquid crystal device according to claim 4, the boundary portion of the transmission display region and the reflection display region extending parallel with a short side of the pixel.

6. The transflective liquid crystal device according to claim 1, a light shielding film being formed on the second transparent substrate, the light shielding film not being formed in the boundary portion of the color filter for transmission display and the color filter for reflection display.

7. The transflective liquid crystal device according to claim 1, the color filter for reflection display being formed thicker than the color filter for transmission display so that the thickness of the liquid crystal layer in the reflection display region becomes thinner than the thickness of the liquid crystal layer in the transmission display region.

8. The transflective liquid crystal device according to claim 1, a layer-thickness adjusting layer being formed on the surface of at least one of the first transparent substrate and the second transparent substrate such that the thickness of the liquid crystal layer in the reflection display region becomes thinner than the thickness of the liquid crystal layer in the transmission display region.

9. The transflective liquid crystal device according to claim 8, the layer-thickness adjusting layer being a transparent layer formed on the second transparent substrate.

10. The transflective liquid crystal device according to claim 9, the layer-thickness adjusting layer being selectively formed in a region overlapping the color filter for reflection display.

11. The transflective liquid crystal device according to claim 10, an end portion of the layer-thickness adjusting layer being located inside the reflection display region.

12. The transflective liquid crystal device according to claim 9, the layer-thickness adjusting layer being thickly formed in the reflection display region, and being formed thinner in the transmission display region than in the reflection display region.

13. The transflective liquid crystal device according to claim 12, the layer-thickness adjusting layer being formed such that a boundary portion of the portion thickly formed in the reflection display region and the portion formed thin in the transmission display region is located in the reflection display region.

14. The transflective liquid crystal device according to claim 7, a columnar protrusion being formed on the surface of at least one of the first transparent substrate and the second transparent substrate, the columnar protrusion defining the substrate gap between the first transparent substrate and the second transparent substrate by protruding from one of the substrates and abutting against the other substrate.

15. An electronic apparatus, comprising:
a display unit including the transflective liquid crystal device according to claim 1.

* * * * *